US006842956B1

United States Patent
Amborn et al.

(10) Patent No.: US 6,842,956 B1
(45) Date of Patent: Jan. 18, 2005

(54) TUBULAR CONNECTION METHOD

(76) Inventors: Peter Amborn, In den Gärten 2, D-53819 Neunkirchen (DE); Simon Jonathan Giles Griffiths, c/o GKN Sankey Limited, Engineering Products Division, Hadley Castle Works, P.O. Box 83, Hadley, Telford, Shropshire, TF1 4RE (GB)

( * ) Notice: Subject to any disclaimer, the term of this patent is extended or adjusted under 35 U.S.C. 154(b) by 0 days.

(21) Appl. No.: 09/286,524

(22) Filed: Sep. 30, 1999

(51) Int. Cl.[7] .................. B23P 17/00; B21D 39/00; B21D 39/03
(52) U.S. Cl. ................. 29/421.1; 29/507; 29/428
(58) Field of Search .............. 29/421.1, 421.2, 29/428, 505, 506, 507, 521, 522.1

(56) References Cited

U.S. PATENT DOCUMENTS 3,002,269 A * 10/1961 Hopkins ............... 29/441.1
4,151,632 A * 5/1979 Green ................. 29/441.1

* cited by examiner

Primary Examiner—John C. Hong
(74) Attorney, Agent, or Firm—Kilpatrick Stockton LLP

(57) ABSTRACT

A process for forming a tubular component including at least a first tubular element connected end to end with a second tubular element, the process including location an end portion of the first tubular element within an end portion of the second tubular element to thereby define respective inner and overlapping end portions, hydro-forming the overlapping end portions to radially expand the inner end portion into face to face contact with the outer end portion and in the region of the expanded overlapping end portions, mutually deforming the inner and outer end portions to define one or more mechanical lock formations for preventing relative axial movement between the first and second tubular elements.

9 Claims, 1 Drawing Sheet

TUBULAR CONNECTION METHOD

The present invention relates to a process for joining tubular elements and to a product formed from tubular elements joined by the process.

In the construction of tubular components such as structural components for a vehicle, it is often desirable to join end to end a pair of tubular elements. Conventionally this is normally achieved by welding or rivetting the tubular elements together.

However, where the materials of the tubes are different, jointing by welding or brazing may not be possible due to the incompatibility of the materials. For example such as in the case for steel and aluminium.

In addition, the different materials may be reactive and cause mutual corrosion when in contact. Again tubular elements of such materials cannot be joined by conventional welding or brazing techniques.

A general aim of the present invention is to provide a process of joining tubular elements which may be of different material and which overcomes disadvantages arising from the incompatibility of the different materials.

Accordingly, it is possible with the present invention to construct structural tubular components having tubular elements of different materials connected end to end. For example, a tubular element formed from steel may be joined to a tubular element formed from aluminium.

According to one aspect of the present invention there is provided a process for forming a tubular component including at least a first tubular element connected end to end with a second tubular element, the process including locating an end portion of the first tubular element within an end portion of the second tubular element to thereby define respective inner and outer overlapping end portions, hydro-forming the overlapping end portions to radially expand the inner end portion into face to face contact with the outer end portion and in the region of the expanded overlapping end portions, mutually deforming the inner and outer end portions to define one or more mechanical lock formations for preventing relative axial movement between the first and second tubular elements.

In this specification the term 'hydro-forming' includes any forming process which utilises a pressurised hydraulic fluid for deforming an element; the pressurised hydraulic fluid may be a solid such as small solid balls which collectively act as a fluid; a liquid such as a suitable oil; or a gas such as steam. The hydro-forming process is performed within a die and may be performed at cold or warm temperatures.

According to another aspect of the present invention there is provided a first tubular element connected end to end with a second tubular element by a connecting joint, the joint comprising inner and outer overlapping end portions formed from respective said first and second tubular elements, the inner and outer end portions being radially expanded into face to face contact by hydro-forming deformation, and one or more mechanical lock formations defined by mutually deforming the overlapping end portions.

Various aspects of the present invention are hereinafter described with reference to the accompanying drawings, in which:—

Figure 1:
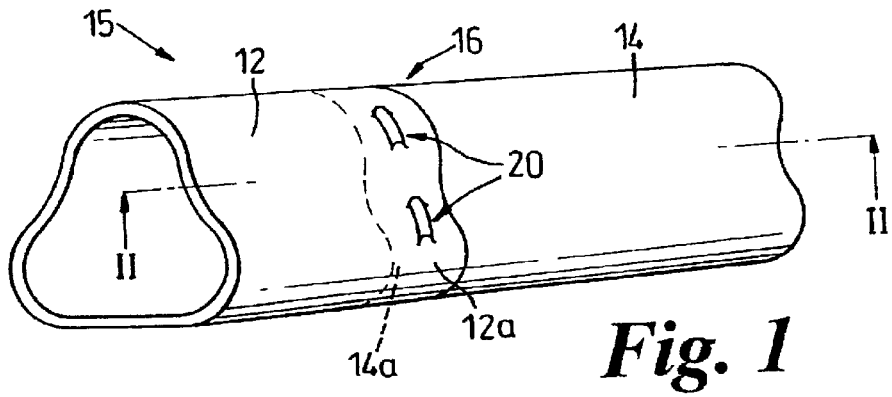
FIG. 1 is a schematic perspective view of a structural tubular component including a pair of tubular elements joined together in accordance with the present invention.
Figure 2:
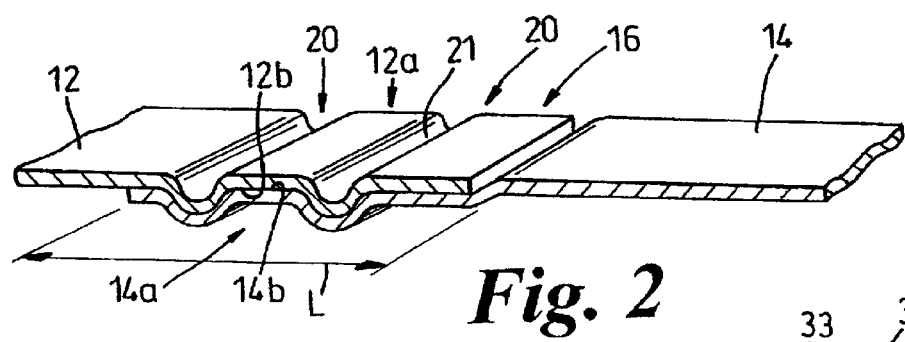
FIG. 2 is a part longitudinal sectional view taken along line II–II in FIG. 1.
Figure 3:
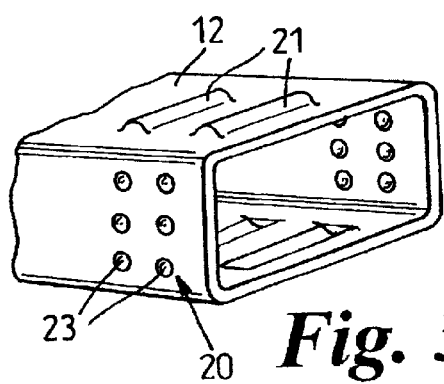
FIG. 3 is a schematic, broken away, part perspective view showing one end of a tubular element after jointing.
Figure 4:
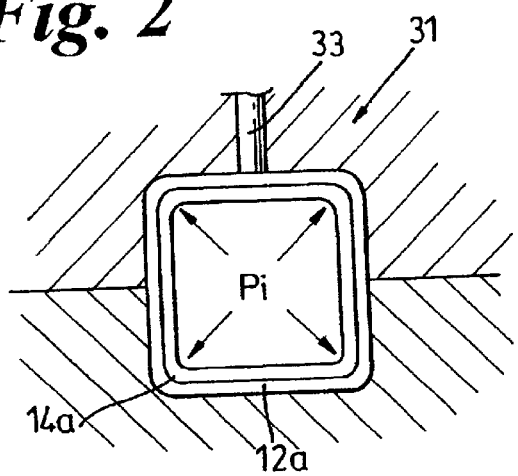
FIG. 4 is a schematic cross-sectional illustration of a hydro-forming die including a punch for forming a mechanical lock formation.

In accordance with the present invention, two tubular elements or tubes 12,14 are joined together in end to end fashion by a joint 16 so as to combine to form a composite tubular component 15 which has desired structural integrity along its entire length.

Accordingly the joint 16 is formed so as to prevent relative axial movement of the tubular elements 12,14 and also prevent relative rotation therebetween about their longitudinal axes. The joined tubes 12,14 are therefore able to accommodate tensile loads which attempt to pull the tubes 12,14 axially apart, compressive loads which attempt to push the tubes 12,14 axially toward one another and torsional loads which attempt to cause relative rotation between the tubes 12,14.

It is possible, therefore, to use tubular components consisting of joined tubes 12,14 in a variety of applications. For example, they may be used as a structural component in vehicle manufacture, or for example, as a drive transmission shaft.

The joint 16 is defined by an end portion 14a of tube 14 being received within end portion 12a of tube 12 such that end portion 12a overlaps and encloses end portion 14a. In accordance with the invention, the overlapping end portions 12a,14a are formed such that the outer face 14b of the internal end formation 14a is in face to face contact with the inner face 12b of the external end formation 12a.

Preferably the cross-sectional shape of the internal and external end portions 12a, 14a is non-circular so as to create a mechanical interaction for preventing relative rotation between the tubes 12,14.

In order to prevent axial separation of the tubes 12,14 mechanical lock formations 20 are provided at selected locations in the region of overlap between the overlapping end portions 12a,14a. The mechanical lock formations 20 may take the form of ribs 21 which generally extend in the circumferential direction of the tubes 12,14. Ribs 21 may extend entirely around the circumference or many only extend partially around the circumference. Several ribs 21 may be provided which are spaced axially from one another along the tubes 12,14.

The mechanical lock formations may also be in the form of dimples 23. The dimples 23 may be spaced both circumferentially and axially from one another. The number of ribs 21 and/or dimples 23 provided and their locations is chosen, bearing in mind the amount of resistance necessary for accommodating axially applied loads.

It is envisaged that bonding compounds may be located between the inner and outer faces 12b,14b respectively in order to supplement the mechanism lock formations.

It is also envisaged that an isolation layer, such as a metal foil, may be located inbetween inner and outer faces 12b,14b respectively in order to physically isolate the tube end portions 12a,14a from one another and thereby define a barrier to prevent reaction between the materials of respective tubes 12,14.

In accordance with one aspect of the present invention, the joint 16 is formed by a hydro-forming process; the hydro-forming process utilising either hot or cold fluid.

To create joint 16, one end of tube 14 is inserted within an end of tube 12 and both tubes 12,14 are located in a hydro-forming die. Hydro-forming is performed at least in the region of the overlapping region of tubes 12,14 thereby causing the end portion 14a of tube 14 to expand radially outwardly to press against the inner face 12b of tube 12. Thereafter further radial expansion causes both end portions 12a,14a to expand together outwardly to take the shape of the surrounding die.

It is envisaged that the lock formations 20 may be simultaneously formed during radial expansion of the end portions 12a,14a by the provision of suitably shaped projections formed in the die.

This way of forming the mechanical formations 20 is suitable in solutions where axial flow of the tubes 12,14 is not required during the hydro-forming process.

Figure 5:
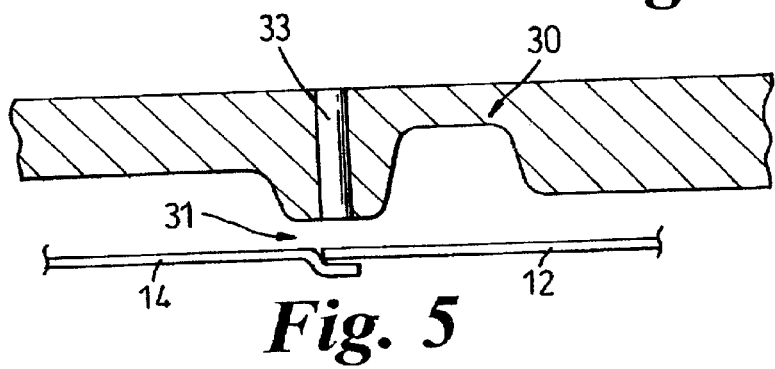
FIG. 5 is a schematic longitudinal sectional illustration of a hydro-forming die.

In situations where axial flow of the tubes 12,14 is required during the hydro-forming process, for example for the formation of deep projections 30 (FIG. 5) it is envisaged that the hydro-forming process is completed before forming the lock formations 20. In this respect, the region 31 of the die corresponding to the region of overlap between tubes 12,14 is left smooth without lock forming projections and so does not impede axial flow of the tubes 12,14 during the hydro-forming process.

Accordingly on completion of the hydro-forming process the end portions 12a,14a have been radially expanded so as to be in mutual face to face contact but will not include mechanical lock formations 20 for preventing relative axial movement between tubes 12,14.

Preferably the mechanical lock formations 20 are created after the hydro-forming process by a plurality of punches 33 located in region 31 of the die. Preferably the punches 33 are activated to punch mechanical lock formations 20 into the overlapping end portions 12a,14a whilst fluid used for the hydro-forming process is retained under pressure within the tubes 12,14. This enables relatively accurately shaped and deep lock formations to be produced.

It will be appreciated that this method of forming lock formations 20 may be used for joining tubes 12,14 which do not require to flow axially during the hydro-forming process.

It will be appreciated that the axial length L of the overlapping region of the end portions 12a,14a is normally chosen to be long enough to give structural integrity between tubes 12,14. However it will be appreciated that the overlapping region is composed of two layers of material and so is reinforced with respect to the remainder of the tubes 12,14. This region may therefore be usefully used in applications where reinforcement is required in a structural element, for example a hinge anchorage region in a vehicle door pillar.

The present invention produces a joint 16 which provides a mechanical connection between the joined tubes 12,14. Accordingly the material of tubes 12,14 may be the same or different. If different the choice of the combination of materials which can be joined is not restricted by welding or brazing compatibility nor, if a barrier layer is used, by corrosive reactivity between the materials.

When the materials of tubes 12,14 are different it is preferred that the tube 12 is formed from the less readily expandable material so that during the hydro-forming process, the more readily expandable material is located internally of tube 12 and so maintains a fluid seal between faces 12b, 14b during radial expansion.

What is claimed is:

1. A process for forming a tubular component including at least a first tubular element connected end to end with a second tubular element, the process including location an end portion of the first tubular element within an end portion of the second tubular element to thereby define respective inner and outer overlapping end portions, hydro-forming the overlapping end portions to radially expand the inner end portion into face to face contact with the outer end portion and in the region of the expanded overlapping end portions, mutually deforming the inner and outer end portions to define one or more mechanical lock formations for preventing relative axial movement between the first and second tubular elements.

2. A process according to claim 1 wherein the mechanical lock formations are formed simultaneously with the radial expansion of the overlapping end portions during the hydro-forming process.

3. A process according to claim 1 wherein the mechanical lock formations are formed subsequently to completion of the hydro-forming process which results in complete radial expansion of the overlapping end portions.

4. A process according to claim 3 wherein the mechanical lock formations are formed by one or more punches which are operated to cause mutual deformation of the overlapping end portions.

5. A process according to claim 4 wherein operation of said one or more punches is performed whilst fluid used in the hydro-forming process is retained under pressure within the tubular elements.

6. A process according to any of claim 1 wherein the material for forming the first tubular element is selected to be the same as the material for forming the first tubular element is selected to be the same as the material for forming the second tubular element.

7. A process according to claim 1 wherein the material for forming the first tubular element is selected to be different to the material for forming the second tubular element.

8. A process according to claim 6 wherein the wall thickness of the first tube is selected to be the same or different to the wall thickness of the second tube.

9. A process according to claim 1 wherein a barrier layer is located between the inner and outer end portions prior to radial expansion.

* * * * *